United States Patent
Hooda et al.

(10) Patent No.: US 9,838,314 B1
(45) Date of Patent: Dec. 5, 2017

(54) CONTEXTUAL SERVICE MOBILITY IN AN ENTERPRISE FABRIC NETWORK ENVIRONMENT

(71) Applicant: Cisco Technology, Inc., San Jose, CA (US)

(72) Inventors: Sanjay Kumar Hooda, Pleasanton, CA (US); Atri Indiresan, Sunnyvale, CA (US); Sandesh Kumar B Narappa, Milpitas, CA (US); Rajesh Arora, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 61 days.

(21) Appl. No.: 15/155,393

(22) Filed: May 16, 2016

(51) Int. Cl.
| | |
|---|---|
| *H04L 29/12* | (2006.01) |
| *H04L 12/741* | (2013.01) |
| *H04L 12/46* | (2006.01) |
| *H04L 12/947* | (2013.01) |

(52) U.S. Cl.
CPC ......... *H04L 45/74* (2013.01); *H04L 12/4633* (2013.01); *H04L 49/25* (2013.01)

(58) Field of Classification Search
None
See application file for complete search history.

(56) References Cited

U.S. PATENT DOCUMENTS

| | | |
|---|---|---|
| 9,276,871 B1 | 3/2016 | Freitas et al. |
| 2014/0173135 A1* | 6/2014 | Varney ................. H04L 67/289 |
| | | 709/245 |

OTHER PUBLICATIONS

Farinacci et al., "The Locator/ID Separation Protocol (LISP)," RFC 6830, Jan. 2013, The Internet Society, Reston, VA (75 pages).
Fuller et al., "Locator/ID Separation Protocol Alternative Logical Topology (LISP+ALT)," RFC 6836, Jan. 2013, The Internet Society, Reston, VA (25 pages).
"LISP Instance—ID Support," Cisco Nexus 7000 Series NX-OS LISP Configuration Guide, Apr. 25, 2014, Cisco Systems, Inc., San Jose, CA (48 pages).
(Continued)

*Primary Examiner* — Fan Ng
(74) *Attorney, Agent, or Firm* — The Law Office of Kirk D. Williams (57) ABSTRACT

In one embodiment, contextual service mobility in an enterprise fabric network environment (e.g., overlay and underlay networks) provides for moving of the location of a service being applied to packets with minimal updates to the mapping database. The mapping database is used to convert addresses of the overlay network to physical network and service addresses. The mapping database provides contextual lookup operations on the same destination address of a packet being forwarded in the overlay network to provide different results. The contextual lookup operations provide for a packet to be forwarded to a service node or its intended destination depending on the current context. In one embodiment, the enterprise fabric network uses Locator/ID Separation Protocol (LISP), a network architecture and set of protocols that uses different overlay and underlay namespaces and a distributed mapping database for converting an overlay address to an underlay address.

22 Claims, 7 Drawing Sheets

(56) References Cited

OTHER PUBLICATIONS

Cabellos et al., "An Architectural Introduction to the Locator/ID Separation Protocol (LISP)," draft-ietf-lisp-introduction-13.txt, Apr. 2, 2015, The Internet Society, Reston, VA (27 pages).
IP Routing: LISP Configuration Guide, Cisco 105 Release 15M&T, Mar. 29, 2013, Cisco Systems, Inc., San Jose, CA (266 pages).
"Locator/ID Separation Protocol (LISP)," 2010, Cisco Systems, Inc., San Jose, CA (5 pages).
Meyer et al., "Locator/ID Separation Protocol (LISP) Tutorial," IETF Vancouver, Dec. 2007, The Internet Society, Reston, VA (43 pages).
"Locator/ID Separation Protocol Architecture," 2011, Cisco Systems, Inc., San Jose, CA (7 pages).
"LISP VM Mobility," Cisco Nexus 7000 Series NX-OS LISP Configuration Guide, Apr. 25, 2014, Cisco Systems, Inc., San Jose, CA (12 pages).

\* cited by examiner

**EDGE NODE PROCESSING
FIGURE 4A**

EDGE NODE PROCESSING
FIGURE 4B

**SERVICE NODE PROCESSING
FIGURE 4C**

ADDING OR MOVING SERVICE NODE
FIGURE 5

CONTEXTUAL SERVICE MOBILITY IN AN ENTERPRISE FABRIC NETWORK ENVIRONMENT

TECHNICAL FIELD

The present disclosure relates generally to packet switching network communications, especially in an enterprise fabric network environment.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology in packet switching networks of various topologies.

An enterprise fabric network uses a network overlay, which is virtual network of interconnected nodes that share an underlying physical network. Examples of network overlays include Virtual Extensible LAN (VXLAN), Network Virtualization Using Generic Routing Encapsulation (NVGRE), Transparent Interconnection of Lots of Links (TRILL), and Location/Identifier Separation Protocol (LISP). LISP is a network architecture and set of protocols that creates two namespaces and uses two IP addresses: Endpoint Identifiers (EIDs), which are assigned to end-hosts, and Routing Locators (RLOCs), which are assigned to physical devices (e.g., routers) that make up the underlay routing system.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with contextual service mobility in an enterprise fabric network environment. One embodiment performs operations in an enterprise fabric network, including a plurality of nodes which includes a first edge node and a second edge node, with a routable address space within the enterprise fabric network not including destination addresses of packets received from external sources, and with the first edge node having a first network address and a service address. In one embodiment, said operations include: maintaining a mapping database including mappings between a plurality of external addresses and the service address, and between other external addresses and addresses of edge nodes of the plurality of nodes; forwarding each particular packet of a plurality of packets externally received by edge nodes of the plurality of nodes to an edge node associated with the service address, which includes determining the service address from a lookup operation in the mapping database based on a destination address of said particular packet, and encapsulating said particular packet in an enterprise fabric transport packet including the service address as a destination address, and sending the enterprise fabric transport packet into the enterprise fabric network; and during the operation of said forwarding the plurality of packets: associating the service address with the second edge node also having a second network address, and converging the routable address space such that enterprise fabric transport packets having a destination address of the service address are now communicated to the second edge node without changing said mappings between the plurality of external addresses and the service address.

One embodiment performs operations in an enterprise fabric network, including a plurality of nodes which includes a first edge node, with a routable address space within the enterprise fabric network not including destination addresses of packets received from external sources, and with the first edge node having a first network address and a service address. In one embodiment, said operations include: maintaining a mapping database including mappings between a plurality of external addresses in a pre-service context and the service address, and between the plurality of external addresses in a post-service context and network addresses of edge nodes of the plurality of nodes; performing a lookup operation in the mapping database in the pre-service context on a destination address of a particular packet externally received by an edge node of the plurality of nodes resulting in the identification of the service address; encapsulating said particular packet in an enterprise fabric transport packet including the service address as a destination address; sending said encapsulated particular packet into the enterprise fabric network; decapsulating said particular packet from said encapsulated particular packet by the first edge node; sending said particular packet to an external service node by the first edge node; receiving by an edge node of the plurality of nodes the particular packet after the service has been applied; performing a lookup operation in the mapping database in the post-service context on the destination address of the particular packet after the service has been applied resulting in the identification of a particular network address of an edge node of the plurality of edge nodes; encapsulating said particular packet after the service has been applied in a second enterprise fabric transport packet including the particular network address as a destination address; and sending said second enterprise fabric transport packet into the enterprise fabric network.

One embodiment performs networking operations in an enterprise fabric network, including a plurality of nodes which includes a plurality of edge nodes, with a routable address space within the enterprise fabric network not including destination addresses of packets received from external sources, and with each of the plurality of edge nodes having a network address. In one embodiment, said networking operations include: maintaining a mapping database including mappings between a plurality of external addresses and one or more service or network addresses for each of a plurality of contexts; and for each particular externally received packet of a plurality of externally received packets by any edge node of the plurality of edge nodes, performing particular operations on said particular externally received packet on a same destination address of said particular externally received packet on a same edge node or different edge nodes of the plurality of edge nodes in at least two different contexts of the plurality of contexts. In one embodiment, said particular operations include: performing a lookup operation in the mapping database in a current context of the plurality of contexts currently associated with said particular externally received packet on a destination address of said particular externally received packet resulting in the identification of a particular service or network address, encapsulating said particular packet in an enterprise fabric transport packet including said identified particular service or network address as a destination address, and sending the enterprise fabric transport packet into the enterprise fabric network.

2. Example Embodiments

Disclosed are, inter alia, methods, apparatus, computer-storage media, mechanisms, and means associated with contextual service mobility in an enterprise fabric network environment (e.g., overlay network environment). Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processing elements, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

In one embodiment, contextual service mobility in an enterprise fabric network environment (e.g., overlay and underlay networks) provides for moving of the location of a service being applied to packets with minimal updates to the mapping database. The mapping database is used to convert addresses of the overlay network to physical network and service addresses. The mapping database provides contextual lookup operations on the same destination address of a packet being forwarded in the overlay network to provide different results. The contextual lookup operations provide for a first lookup operation on the destination address of the packet resulting in the packet being forwarded to a service node, with a second post-service-applied lookup operation on the same destination address in the second context resulting in the packet being forwarded to its intended destination or to another service node.

In one embodiment, the enterprise fabric network uses Locator/ID Separation Protocol (LISP), a network architecture and set of protocols that uses different overlay and underlay namespaces and a distributed mapping database for converting an overlay address to an underlay address. LISP is described in Farinacci et al., "The Locator/ID Separation Protocol (LISP)," RFC 6830, The Internet Society, Reston, Va., January 2013. Therein, RFC 6830 defines a Routing Locator (RLOC) as an Internet Protocol version 4 (IPv4) or version 6 (IPv6) address of an Egress Tunnel Router (ETR).

In contrast, one embodiment disclosed herein broadens the meaning of an RLOC to include a service address of a network service to be applied to a packet. Examples of such a network service includes, but is not limited to, firewall, intrusion prevention system (IPS), intrusion detection system (IDS), deep packet inspection, load balancing, Network Address Translation (NAT), Network-based Application Recognition (NBAR), authentication, encryption, wide area network (WAN) optimization, and Internet Protocol Security (IPsec).

Additionally, one embodiment expands the use of a mapping database between overlay and underlay addresses to include contextual lookup operations for a same destination address of a same packet to provide two different mapping lookup results. As used herein a "same packet" refers to an exact same packet as well as a packet before and after processing (e.g., applying a service by a service node) which may include modifying one or more fields of the packet. Thus, a mapping lookup operation on a packet might initially determine to "intercept" the packet and send it to a service node for applying a service (e.g., firewall) before forwarding to its intended destination. In one embodiment, the context of a mapping lookup operation is identified by a source address of the edge router performing the lookup operation. In one embodiment, the context of a mapping lookup operation is identified by a virtual network (VN) value, such as, but not limited to a first VN value identifying a pre-service-applied condition, and a second VN value identifying a post-service-applied condition. As used herein, a mapping lookup operation by a network device (e.g., an edge node) includes, but is not limited to, checking a local mapping cache and/or sending a request to another device for the lookup result. As used herein, a Virtual Network includes, but is not limited to, a virtual local area network (VLAN), bridge domain (BD), and/or virtual routing and forwarding (VRF).

In one embodiment, the enterprise fabric network uses a network overlay different than LISP, such as, but not limited to Virtual Extensible LAN (VXLAN), Network Virtualization Using Generic Routing Encapsulation (NVGRE), and Transparent Interconnection of Lots of Links (TRILL).

Figure 1A:
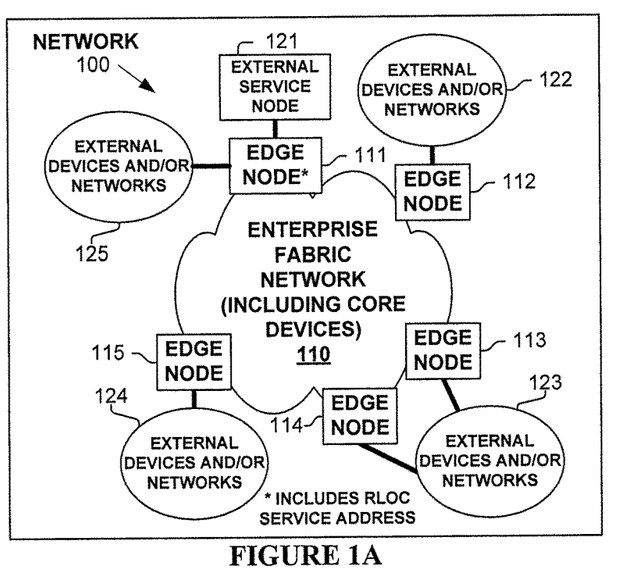
FIG. 1A illustrates a network operating according to one embodiment.

FIG. 1A illustrates a network 100 operating according to one embodiment. As shown, network 100 includes and enterprise fabric network 110, which edge nodes 111-115 as well as multiple interconnecting core devices. Each of edge nodes 111-115 provides interfaces to external devices (e.g., end-user devices, service nodes) and/or networks 121-124. As shown, edge node 111 provides an interface to and from external (that is external to enterprise fabric network 110) service node 121. In one embodiment, external service node 121 has an enterprise network address that is associated with edge node 111 to provide access by enterprise fabric network 110 to service node 121. In one embodiment, enterprise fabric network 110 uses LISP, and the service address is an RLOC.

Figure 1B:
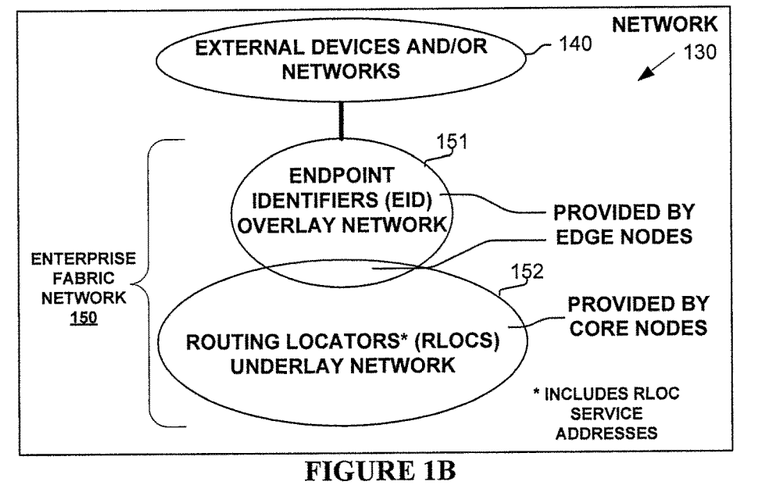
FIG. 1B illustrates a network operating according to one embodiment.

FIG. 1B illustrates another view of a network 130 operating according to one embodiment. Shown in FIG. 1B are enterprise fabric network 150 and external devices and/or networks 140. In one embodiment, LISP Endpoint Identifiers (EIDs) are used by external devices and/or networks as well as the overlay network of enterprise fabric network 150. Edge nodes of enterprise fabric network 150 use EIDs for the overlay portion of the enterprise fabric network 150 and a mapping database to convert an EID to a LISP Routing Locator (RLOC) used by the underlay network of enterprise fabric network 150 to route packets therein. Thus, an edge node is part of both the overlay and underlay network of the enterprise fabric network 150 as well as being an interface between overlay and underlay networks. In one embodiment, an RLOC is expanded to include an address of a service to be applied to a packet via a service node.

Figure 1C:
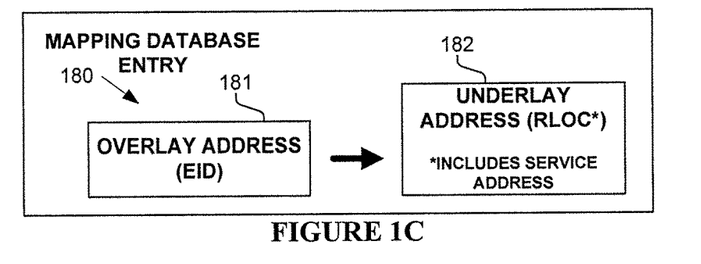
FIG. 1C illustrates a mapping database entry according to one embodiment.

FIG. 1C illustrates a mapping database entry 180 according to one embodiment. An overlay address 181 (e.g., LISP EID) is mapped to an underlay address 182 (e.g., LISP RLOC expanded to include service addresses).

Previously, thousands (and even orders of magnitude more) of EIDs would be mapped to a RLOC physical address of an edge node in order to reach a service node. Thus, when a service node, or the location of the service, moved, each of these large number of mappings needed to be updated.

By using a service address as an RLOC for accessing a network service, one embodiment does not need to modify any entries in the mapping database when a service node or service is moved. Rather, the location of the service node/service is updated in the underlay network which quickly converges and forwards packets to the new location.

Figure 2A:
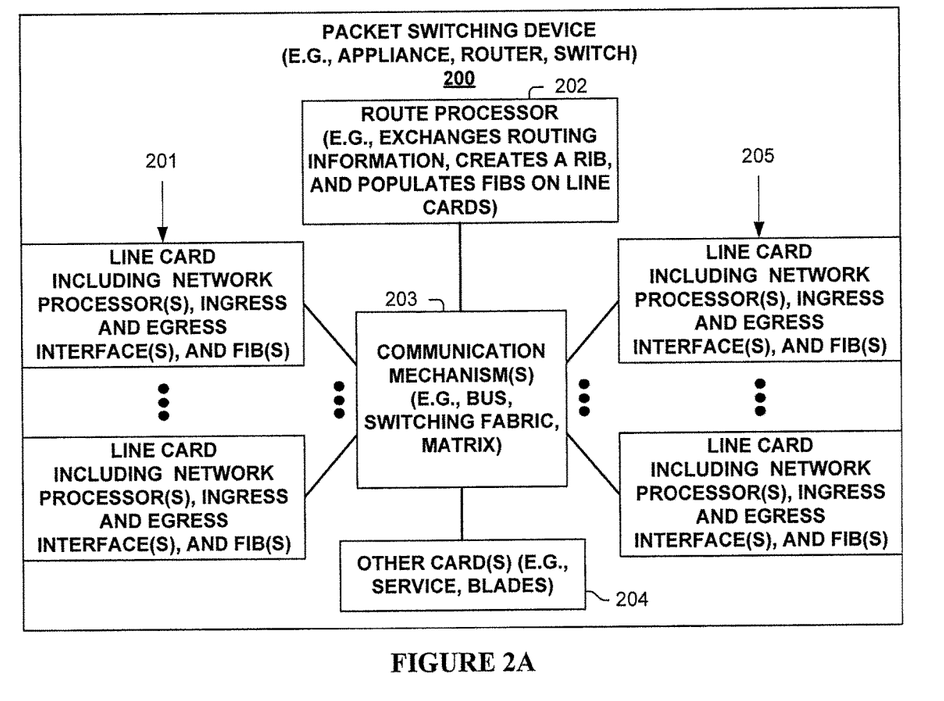
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with contextual service mobility in an enterprise fabric network environment. Packet switching device 200 also has a control plane with one or more processing elements 202 for managing the control plane and/or control plane processing of packets associated with contextual service mobility in an enterprise fabric network environment. Packet switching device 200 also includes other cards 204 (e.g., service cards, blades) which include processing elements that are used in one embodiment to process packets associated with contextual service mobility in an enterprise fabric network environment, and some communication mechanism 203 (e.g., bus, switching fabric, matrix) for allowing its different entities 201, 202, 204 and 205 to communicate. In one embodiment, route processor 202 and/or line card(s) 201 perform lookup operations in a mapping database.

Line cards 201 and 205 typically perform the actions of being both an ingress and egress line card, in regards to multiple other particular packets and/or packet streams being received by, or sent from, packet switching device 200. In one embodiment, line cards 201 and/or 205 perform packet processing operations, including, but not limited to, determining how to ingress and/or egress process packets. Even though the term FIB includes the word "forwarding," this information base typically includes other information describing how to process corresponding packets.

Figure 2B:
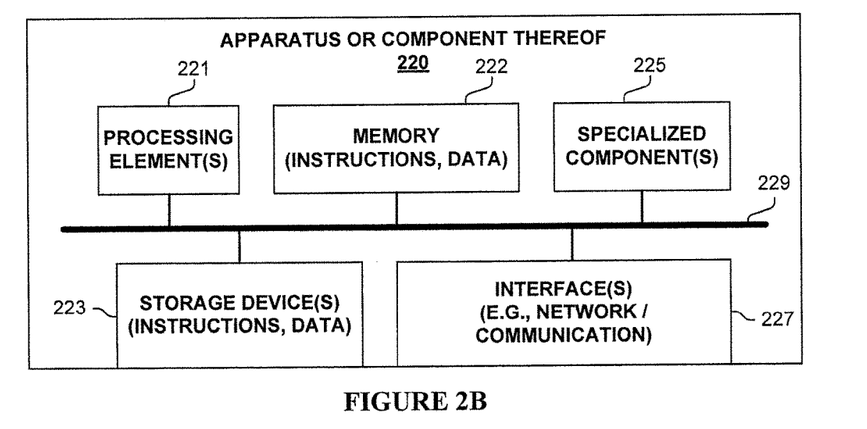
FIG. 2B illustrates an apparatus or component thereof according to one embodiment.

FIG. 2B is a block diagram of an apparatus 220 used in one embodiment associated with contextual service mobility in an enterprise fabric network environment. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221 (typically with on-chip memory), memory 222, storage device(s) 223, specialized component(s) 225 (e.g. optimized hardware such as for performing lookup and/or packet processing operations, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

As used herein in relation to an embodiment, an "RLOC" refers to a definition expanded from RFC 6830 to include service addresses of network services to be applied to packets by an external server node.

Figure 3A:
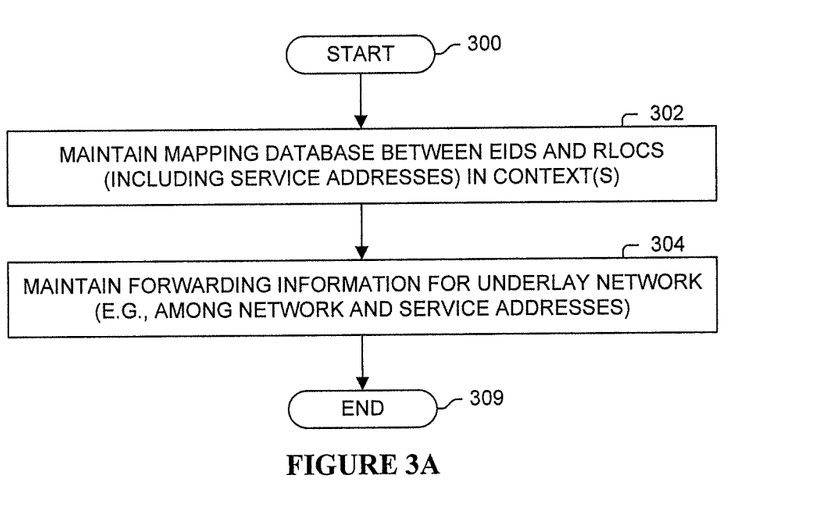
FIG. 3A illustrates a process according to one embodiment.

FIG. 3A illustrates a process according to one embodiment. In process block 302, a mapping database is maintained within an enterprise fabric network, such as, but not limited to, in a distributed fashion including local caches in individual packet switching devices of the enterprise fabric network and one or more mapping database servers. In one embodiment, LISP is used by the enterprise fabric network and includes mappings between EIDs and RLOCs. In process block 304, forwarding information is maintained by the underlay network (e.g., using one or more routing protocols) for transporting fabric network transport networks among nodes of the enterprise fabric network. Processing of the flow diagram of FIG. 3A is complete as indicated by process block 309.

Figure 3B:
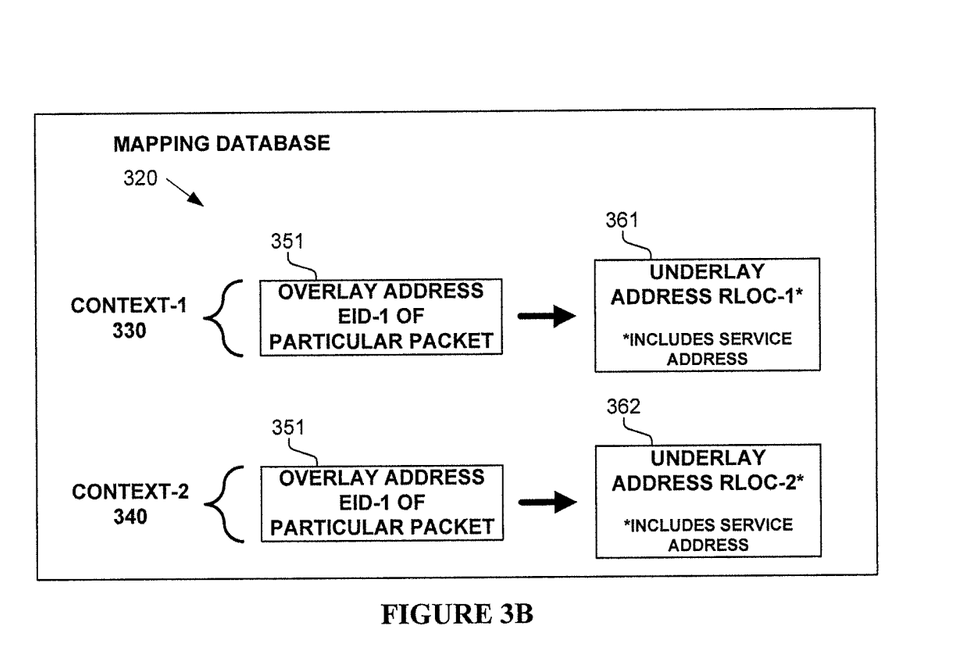
FIG. 3B illustrates a mapping database according to one embodiment.

FIG. 3B illustrates a mapping database 320 according to one embodiment, which provides for lookup operations based on an overlay address of a same packet in a context (e.g., pre-service and post-service) in a mapping database between an overlay address and an underlay address. As shown, in context-1 (330), a lookup operation on overlay address EID-1 (351) of a particular packet results in underlay address RLOC-1 (361). While in context-2 (340), a lookup operation on the same overlay address EID-1 (351) of the same particular packet results in different underlay address RLOC-2 (362).

In one embodiment, the context of a mapping lookup operation is identified by a source address of the edge router performing the lookup operation. In one embodiment, the context of a mapping lookup operation is identified by a virtual network (VN) value, such as, but not limited to a first VN value identifying a pre-service-applied condition, and a second VN value identifying a post-service-applied condition. One embodiment includes multiple mapping databases and a context is identified by which mapping database is accessed (e.g., pre-service, post-service).

Figure 4A:
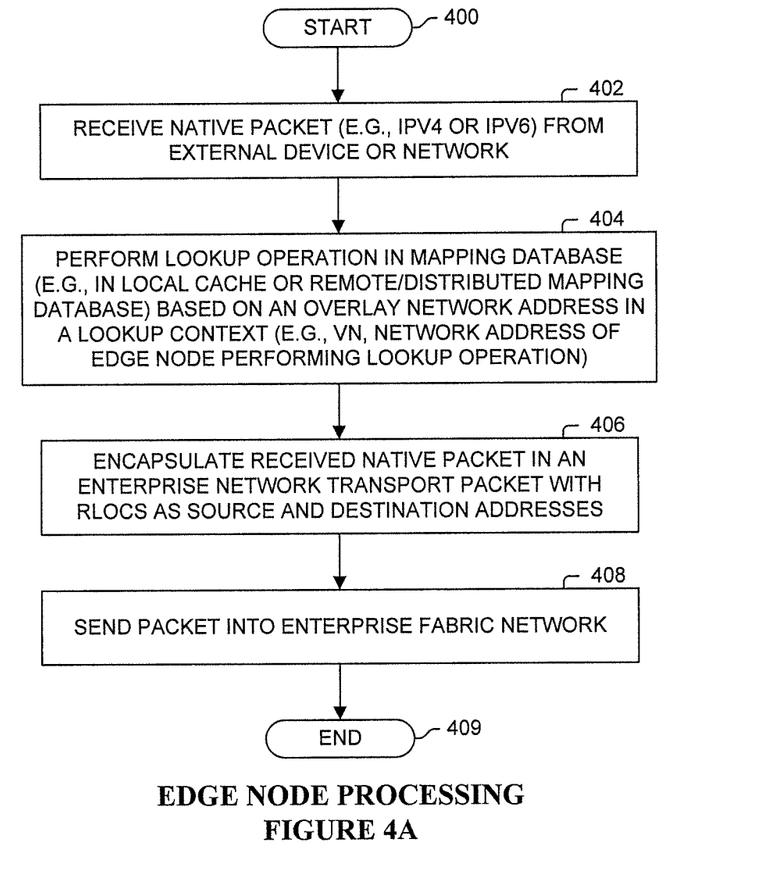
FIG. 4A illustrates a process according to one embodiment.

FIG. 4A illustrates a process according to one embodiment performed by an edge node of an enterprise fabric network. Processing begins with process block 400. In process block 402, a native packet (e.g., a non-enterprise network transport packet such as an IPv4 or IPv6 packet) is received from an external device (e.g., end-user device, service node) or network. In process block 404, a lookup operation is performed in the mapping database based on an overlay network address (e.g., EID, MAC address, any device identifier, IPv4 or IPv6 packet type) in a lookup context (e.g., pre-service) in order to identify where to forward the packet. In process block 406, the received packet is encapsulated in an enterprise fabric network packet with an underlay network address (e.g., RLOC) of the edge node as its source address and the underlay address (e.g., RLOC) of the egress edge node (e.g., Egress Tunnel Router) or of a service to be applied to the native packet. In process block 408, the enterprise transport packet encapsulating the received native packet is sent into the enterprise fabric network for being transported to its destination. Processing of the flow diagram of FIG. 4A is complete as indicated by process block 409.

Figure 4B:
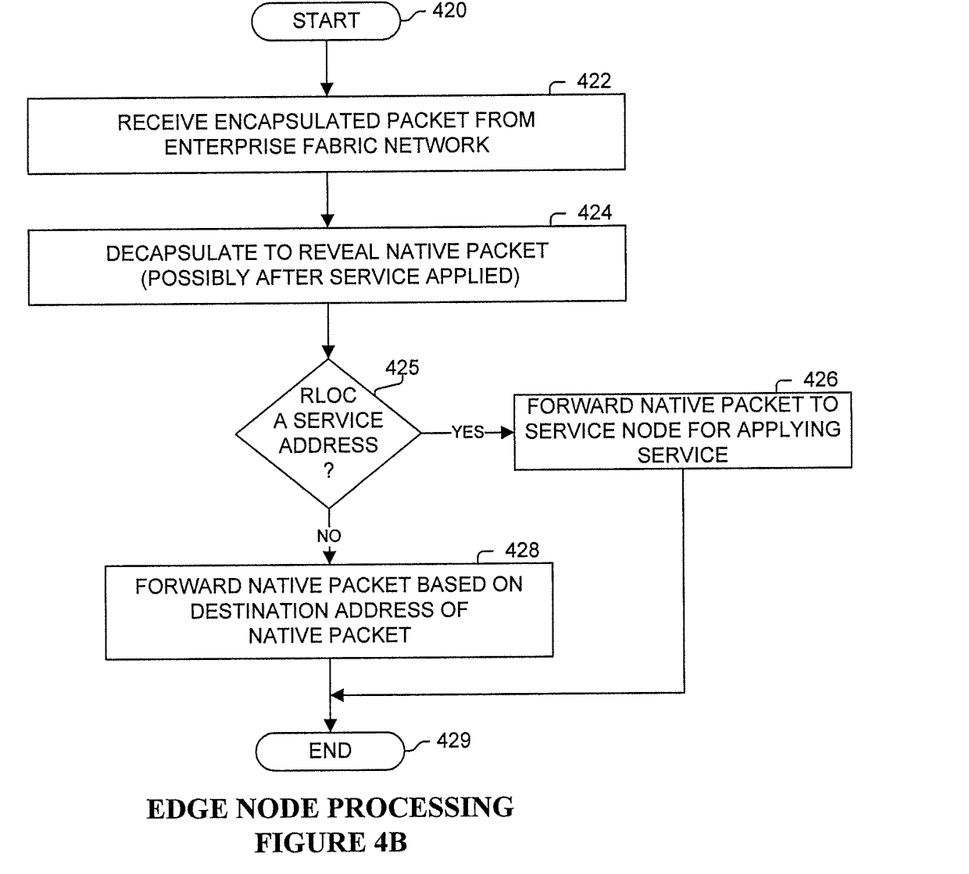
FIG. 4B illustrates a process according to one embodiment.

FIG. 4B illustrates a process according to one embodiment performed by an edge node of an enterprise fabric network. Processing begins with process block 420. In process block 422, an enterprise fabric transport packet encapsulating a native packet is received from the enterprise fabric network. In process block 424, the native packet is revealed via a decapsulation operation. As determined in process block 425, if the destination address (e.g., RLOC) of the received enterprise fabric transport packet is a service address, processing proceeds to process block 426, else to process block 428. In process block 426, the native packet is forwarded to an external service node for applying the network service to the native packet; and processing continues to process block 429. In process block 428, the native packet is forwarded from the enterprise fabric network according to its native destination address, and processing continues to process block 429. Processing the flow diagram of FIG. 4B is compete as indicated by process block 429.

Figure 4C:
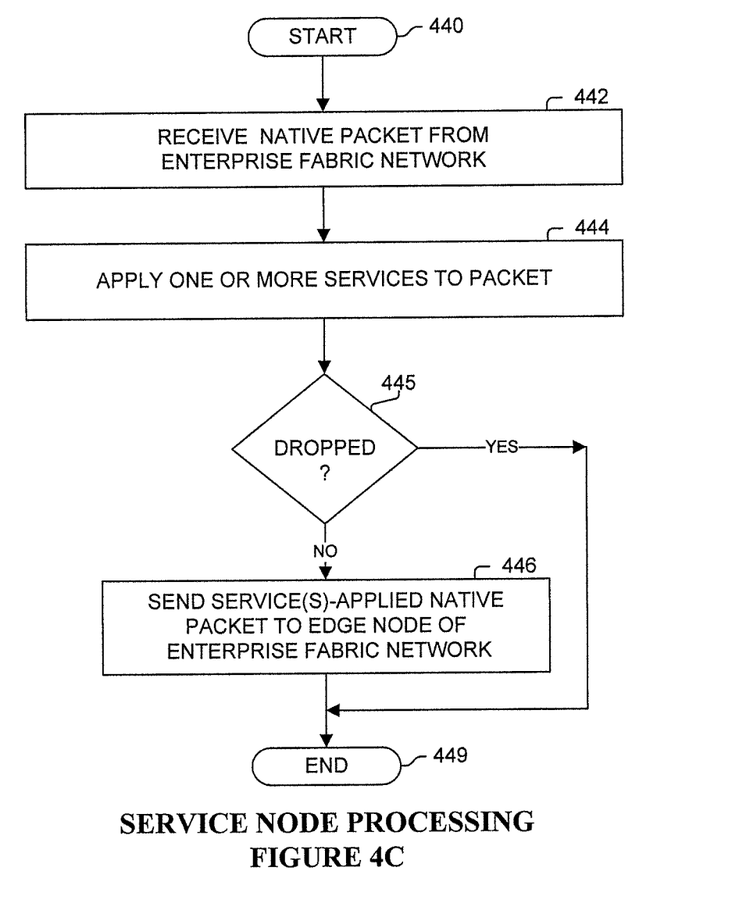
FIG. 4C illustrates a process according to one embodiment.

FIG. 4C illustrates a process according to one embodiment performed by a service node external to an enterprise fabric network. Processing begins with process block 440. In process block 442, a native packet is received from the enterprise fabric network. In process block 444, one or more network services is applied to the packet. As determined in process block 445, if the packet is dropped, then processing proceeds to process block 449; otherwise, in process block 446, the service(s)-applied packet is communicated to an edge node of the enterprise fabric network, and processing proceeds to process block 449. Processing the flow diagram of FIG. 4B is compete as indicated by process block 449.

Figure 5:
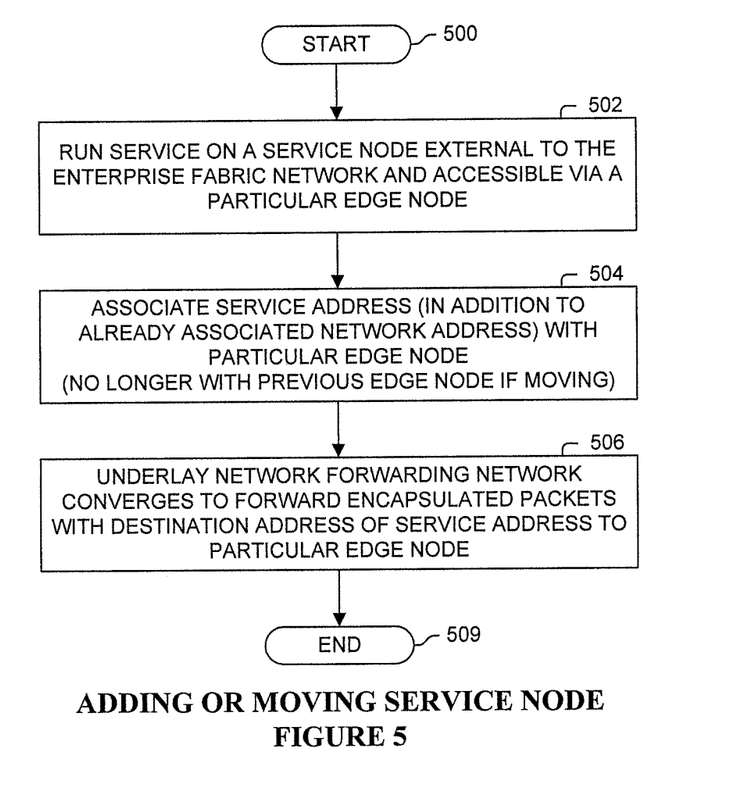
FIG. 5 illustrates a process according to one embodiment.

FIG. 5 illustrates a process according to one embodiment performed by an enterprise fabric network for adding or moving a service node. Processing of the flow diagram of FIG. 5 begins with process block 500. In process block 502, the service is run on a service node external to the enterprise fabric and accessible to the enterprise fabric network via a particular edge node. In process block 504, the service address is associated with the particular edge node in addition to its physical network address. If the service is being moved to be accessible by a different edge node of the enterprise fabric network, then the service will no longer be accessible via this different edge node as the associate of this service with this different edge node is removed. In process block 506, the underlay network forwarding (e.g., routing) information converges to forward encapsulated packets with the destination address of the service address to the particular edge node, which then will decapsulate and forward the native packet to the service node corresponding to the service address. Processing of the flow diagram of FIG. 5 is complete as indicated by process block 509.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
performing operations in an enterprise fabric network, including a plurality of nodes which includes a first edge node and a second edge node, with a routable address space within the enterprise fabric network not including destination addresses of packets received from external sources, and with the first edge node having a first network address and a service address; wherein said operations include:
maintaining a mapping database including mappings between a plurality of external addresses and the service address, and between other external addresses and addresses of edge nodes of the plurality of nodes;
forwarding each particular packet of a plurality of packets externally received by edge nodes of the plurality of nodes to an edge node associated with the service address, which includes determining the service address from a lookup operation in the mapping database based on a destination address of said particular packet, and encapsulating said particular packet in an enterprise fabric transport packet including the service address as a destination address, and sending the enterprise fabric transport packet into the enterprise fabric network; and
during the operation of said forwarding the plurality of packets: associating the service address with the second edge node also having a second network address, and converging the routable address space such that enterprise fabric transport packets having a destination address of the service address are now communicated to the second edge node without changing said mappings between the plurality of external addresses and the service address.

2. The method of claim 1, wherein the enterprise fabric network uses Locator/ID Separation Protocol (LISP), including: each of the plurality of external addresses being an Endpoint ID (EID), each of first and second edge nodes being an Egress Tunnel Router (ETR), each of the service address and first and second network addresses being a Routing Locator (RLOC), and the mapping database including EIDs-to-RLOCs mappings.

3. The method of claim 2, including: applying a service to packets of the plurality of packets externally received by edge nodes of the plurality of nodes by a first service node accessible to the enterprise fabric network via the first edge node when the operation of said forwarding the plurality of packets commences; and applying the service to packets of the plurality of packets externally received by edge nodes of the plurality of nodes by a second service node accessible to the enterprise fabric network via the second edge node after said associating and converging operations.

4. The method of claim 3, wherein the service is a firewall service.

5. The method of claim 1, including: applying a service to packets of the plurality of packets externally received by edge nodes of the plurality of nodes by a first service node accessible to the enterprise fabric network via the first edge node when the operation of said forwarding the plurality of packets commences; and applying the service to packets of the plurality of packets externally received by edge nodes of the plurality of nodes by a second service node accessible to the enterprise fabric network via the second edge node after said associating and converging operations.

6. The method of claim 5, wherein said mappings between the plurality of external addresses and the service address includes mappings between the plurality of external addresses in a pre-service context and the service address; wherein said maintaining the mapping database includes mappings between the plurality of external addresses in a post-service context and network addresses of edge nodes of the plurality of edge nodes; and wherein the lookup operation in the mapping database based on the destination address of said particular packet is performed in a pre-service context.

7. The method of claim 6, comprising:
receiving a post-service processed said particular packet by either the first edge node or the second edge node;
performing a lookup operation in the mapping database of a destination address of the post-service processed said particular packet in the post-service context resulting in the identification of a particular network address of an edge node of the plurality of nodes or a second service address;
encapsulating said the post-service processed said particular packet in a second enterprise fabric transport packet including the particular network address or the second service address as a destination address; and
sending the second enterprise fabric transport packet into the enterprise fabric network.

8. The method of claim 7, wherein the pre-service context is a virtual network (VN) identifier, and the post-service context is a different VN identifier.

9. The method of claim 7, wherein each of the pre-service and post-service context is a network address of the edge node of the plurality of nodes performing the lookup operation in the mapping database.

10. The method of claim 7, wherein the enterprise fabric network uses Locator/ID Separation Protocol (LISP), including: each of the plurality of external addresses being an Endpoint ID (EID), each of first and second edge nodes being an Egress Tunnel Router (ETR), each of the service address and first and second network addresses and the second service address and the particular network address being a Routing Locator (RLOC), and the mapping database including EIDs-to-RLOCs mappings in pre-service and post-service contexts.

11. A method, comprising:
performing operations in an enterprise fabric network, including a plurality of nodes which includes a first edge node, with a routable address space within the enterprise fabric network not including destination addresses of packets received from external sources, and with the first edge node having a first network address and a service address; wherein said operations include:

maintaining a mapping database including mappings between a plurality of external addresses in a pre-service context and the service address, and between the plurality of external addresses in a post-service context and network addresses of edge nodes of the plurality of nodes;

performing a lookup operation in the mapping database in the pre-service context on a destination address of a particular packet externally received by an edge node of the plurality of nodes resulting in the identification of the service address;

encapsulating said particular packet in an enterprise fabric transport packet including the service address as a destination address;

sending said encapsulated particular packet into the enterprise fabric network;

decapsulating said particular packet from said encapsulated particular packet by the first edge node;

sending said particular packet to an external service node by the first edge node;

receiving by an edge node of the plurality of nodes the particular packet after the service has been applied;

performing a lookup operation in the mapping database in the post-service context on the destination address of the particular packet after the service has been applied resulting in the identification of a particular network address of an edge node of the plurality of edge nodes;

encapsulating said particular packet after the service has been applied in a second enterprise fabric transport packet including the particular network address as a destination address; and sending said second enterprise fabric transport packet into the enterprise fabric network.

12. The method of claim 11, wherein the enterprise fabric network uses Locator/ID Separation Protocol (LISP), including: each of the plurality of external addresses being an Endpoint ID (EID), each of the service address and particular network address being a Routing Locator (RLOC), and the mapping database including EIDs-to-RLOCs mappings in pre-service and post-service contexts.

13. The method of claim 12, wherein the pre-service context is a virtual network (VN) identifier, and the post-service context is a different VF identifier.

14. The method of claim 12, wherein each of the pre-service and post-service context is a network address of the edge node of the plurality of nodes performing the lookup operation in the mapping database.

15. The method of claim 11, wherein the pre-service context is a virtual network (VN) identifier, and the post-service context is a different VF identifier.

16. The method of claim 11, wherein each of the pre-service and post-service context is a network address of the edge node of the plurality of nodes performing the lookup operation in the mapping database.

17. A method, comprising:
performing networking operations in an enterprise fabric network, including a plurality of nodes which includes a plurality of edge nodes, with a routable address space within the enterprise fabric network not including destination addresses of packets received from external sources, and with each of the plurality of edge nodes having a network address; wherein said networking operations include:

maintaining a mapping database including mappings between a plurality of external addresses and one or more service or network addresses for each of a plurality of contexts; and for each particular externally received packet of a plurality of externally received packets by any edge node of the plurality of edge nodes, performing particular operations on said particular externally received packet on a same destination address of said particular externally received packet on a same edge node or different edge nodes of the plurality of edge nodes in at least two different contexts of the plurality of contexts, with said particular operations including:

performing a lookup operation in the mapping database in a current context of the plurality of contexts currently associated with said particular externally received packet on a destination address of said particular externally received packet resulting in the identification of a particular service or network address, encapsulating said particular packet in an enterprise fabric transport packet including said identified particular service or network address as a destination address, and sending the enterprise fabric transport packet into the enterprise fabric network.

18. The method of claim 17, wherein the enterprise fabric network uses Locator/ID Separation Protocol (LISP), including: each of the plurality of external addresses being an Endpoint ID (EID), each of the service and network addresses being a Routing Locator (RLOC), and the mapping database including EIDs-to-RLOCs mappings in each of the plurality of contexts.

19. The method of claim 17, wherein said two different contexts includes a pre-service and post-service context for a service applied to said particular externally received packet.

20. The method of claim 19, wherein each of the plurality of contexts is a different virtual network (VN) identifier or a network address of an edge node of the plurality of nodes performing the lookup operation in the mapping database.

21. An enterprise fabric network, including:
a plurality of nodes which includes a first edge node and a second edge node, with a routable address space within the enterprise fabric network not including destination addresses of packets received from external sources, and with the first edge node having a first network address and a service address;

wherein the plurality of nodes maintain a mapping database including mappings between a plurality of external addresses and the service address, and between other external addresses and addresses of edge nodes of the plurality of nodes;

wherein edge nodes of the plurality of nodes receive forward each particular packet of a plurality of packets externally received by a corresponding edge node and forward to another edge node associated with the service address, which includes determining the service address from a lookup operation in the mapping database based on a destination address of said particular packet, and encapsulating said particular packet in an enterprise fabric transport packet including the service address as a destination address, and sending the enterprise fabric transport packet into the enterprise fabric network; and wherein during the operation of said forwarding the plurality of packets: associating the service address with the second edge node also having a second network address, and converging the routable address space such that enterprise fabric transport packets having a destination address of the service address are now communicated to the second edge node without changing said mappings between the plurality of external addresses and the service address.

22. The enterprise fabric of claim 21, wherein the enterprise fabric network uses Locator/ID Separation Protocol (LISP), including: each of the plurality of external addresses being an Endpoint ID (EID), each of first and second edge nodes being an Egress Tunnel Router (ETR), each of the service address and first and second network addresses being a Routing Locator (RLOC), and the mapping database including EIDs-to-RLOCs mappings.

* * * * *